US012630008B2

(12) United States Patent
Matsson

(10) Patent No.: US 12,630,008 B2
(45) Date of Patent: May 19, 2026

(54) POSITIONING MECHANISM AND LID ASSEMBLY, ESPECIALLY FOR A CHARGING PORT ASSEMBLY OF A VEHICLE

(71) Applicant: Volvo Car Corporation, Gothenburg (SE)

(72) Inventor: Magnus Matsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 450 days.

(21) Appl. No.: 18/458,271

(22) Filed: Aug. 30, 2023

(65) Prior Publication Data

US 2024/0076920 A1     Mar. 7, 2024

(30) Foreign Application Priority Data

Sep. 1, 2022    (EP) .................................... 22193519

(51) Int. Cl.
  *B60K 15/05*          (2006.01)
  *E05D 11/08*          (2006.01)
(52) U.S. Cl.
  CPC ........ *B60K 15/05* (2013.01); *B60K 2015/053* (2013.01); *E05Y 2201/218* (2013.01);
        (Continued)
(58) Field of Classification Search
  CPC .............. B60K 15/05; B60K 2015/053; B60K 2015/0546; E05C 17/44; E05Y 2201/218;
        (Continued)

(56) References Cited

U.S. PATENT DOCUMENTS 5,658,036 A  *  8/1997  Benoist .................. B60K 15/05
                                          296/97.22
8,089,228 B2 *  1/2012  Ballard .................. B60K 15/05
                                          73/1.03
(Continued)

FOREIGN PATENT DOCUMENTS

DE      102019100787 A1      7/2020
DE      102019117316 A1      12/2020
(Continued)

OTHER PUBLICATIONS

Extended European Search Report received for European Application Serial No. 22 193 519.0 dated Feb. 17, 2023, 5 pages.

*Primary Examiner* — Gregory A Blankenship
(74) *Attorney, Agent, or Firm* — Amin, Turocy & Watson, LLP

(57)          ABSTRACT
The disclosure relates to a positioning mechanism for holding a lid element of a vehicle in an intermediate position between a fully open position and a fully closed position. The positioning mechanism comprises a base component, a first friction block carrying a first friction surface, a counter surface, and an engagement element. The first friction block is supported on the base component via two pivotable first lever arms such that the two first lever arms, the friction block, and a portion of the base component form a first parallelogram. The counter surface faces the first friction surface and is arranged in parallel to the first friction surface such that the first friction surface and the counter surface define a movement channel extending along a movement channel direction. The engagement element is receivable in the movement channel and the first lever arms are inclined with respect to a movement channel direction.

20 Claims, 2 Drawing Sheets

(52) U.S. Cl.
CPC ..... *E05Y 2201/26* (2013.01); *E05Y 2201/262* (2013.01); *E05Y 2201/626* (2013.01); *E05Y 2800/75* (2013.01); *E05Y 2900/534* (2013.01)

(58) Field of Classification Search
CPC ........... E05Y 2201/26; E05Y 2201/262; E05Y 2201/626; E05Y 2800/75; E05Y 2900/534; E05D 11/08; E05D 11/1014; E05D 3/18; E05D 15/30
USPC ................................ 296/97.22; 16/350, 357
See application file for complete search history.

(56) References Cited

U.S. PATENT DOCUMENTS

| | | | |
|---|---|---|---|
| 2003/0178434 A1* | 9/2003 | Kato ...................... | B60K 15/05 |
| | | | 220/811 |
| 2014/0333087 A1* | 11/2014 | Krajenke ................. | F16F 7/08 |
| | | | 296/76 |
| 2020/0055389 A1 | 2/2020 | Herzig | |
| 2021/0206258 A1* | 7/2021 | Tani ................... | E05B 47/0046 |
| 2022/0307308 A1* | 9/2022 | McDonald ............. | E05F 5/003 |
| 2024/0034146 A1* | 2/2024 | Winter .................. | B60K 15/05 |
| 2024/0076920 A1* | 3/2024 | Matsson ............... | B60K 15/05 |

FOREIGN PATENT DOCUMENTS

| | | | |
|---|---|---|---|
| DE | 102020115360 A1 | 12/2020 | |
| DE | 202021003556 U1 | 1/2022 | |
| EP | 3424765 A1 | 1/2019 | |

* cited by examiner

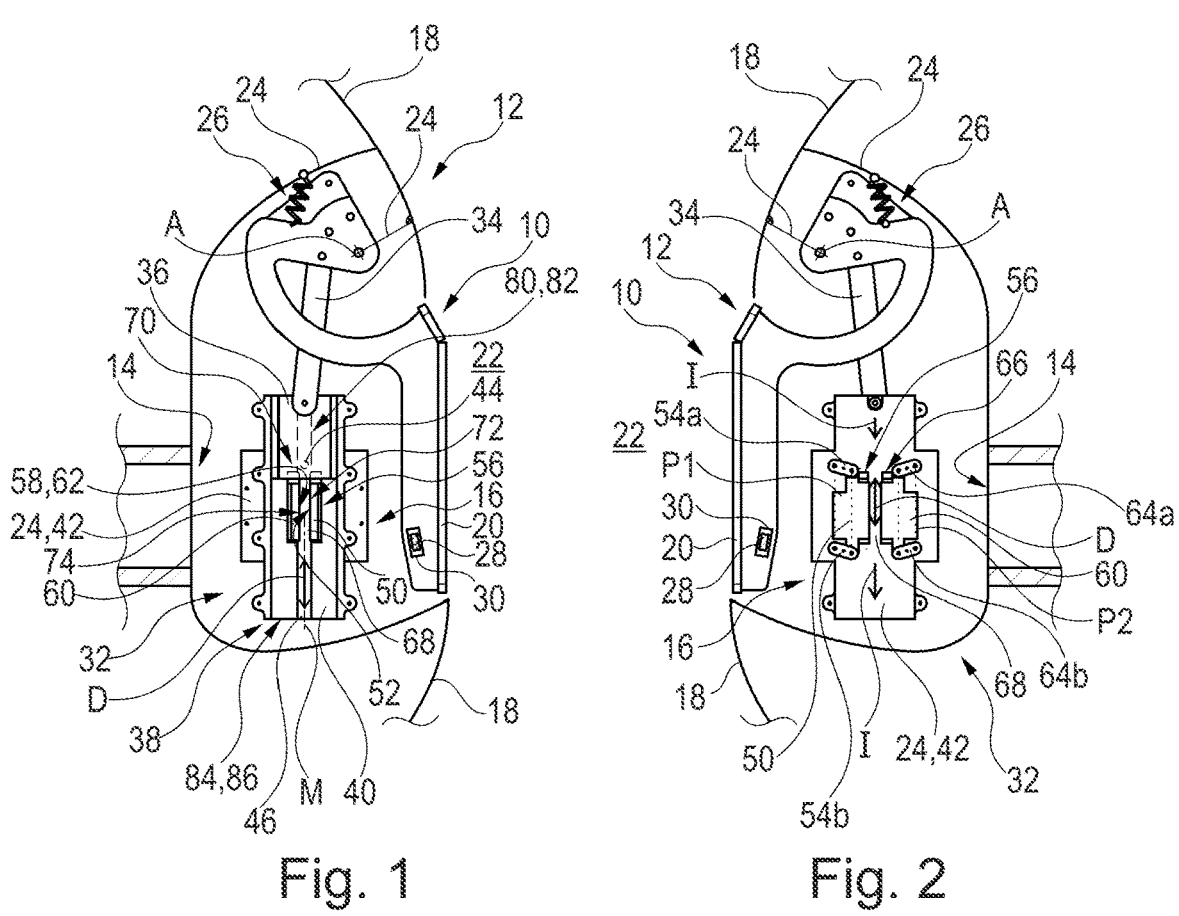
Fig. 1
Fig. 2
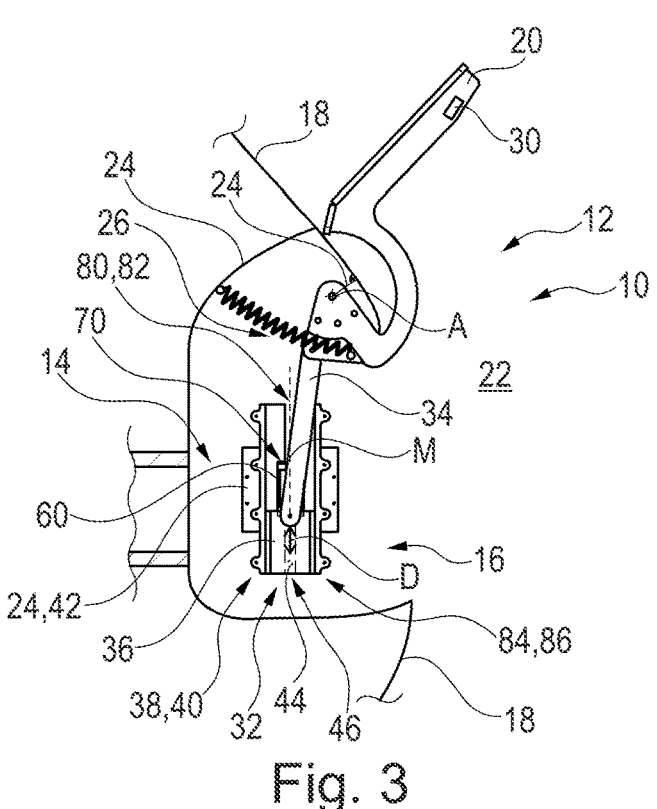
Fig. 3

POSITIONING MECHANISM AND LID ASSEMBLY, ESPECIALLY FOR A CHARGING PORT ASSEMBLY OF A VEHICLE

CROSS-REFERENCE TO RELATED APPLICATIONS

This application claims the benefit of and priority to pending EP patent application serial number 22193519.0, filed Sep. 1, 2022, and entitled "POSITIONING MECHANISM AND LID ASSEMBLY, ESPECIALLY FOR A CHARGING PORT ASSEMBLY OF A VEHICLE," the entirety of which is hereby incorporated by reference herein.

TECHNICAL FIELD

The present disclosure relates to a positioning mechanism for holding a lid element of a vehicle in an intermediate position between a fully open position and a fully closed position, and a lid assembly for a vehicle.

BACKGROUND

Lid assemblies or simply lids are omnipresent in vehicles. Examples of lids include lids for protecting a refueling port of a vehicle or for protecting a charging port of the vehicle. In these examples, the lids may be selectively opened in order to access the refueling port or the charging port. In a closed position, the lids protect the refueling port or the charging port from environmental influences.

SUMMARY

In some situations, it may be desirable that the lid is able to assume an intermediate position, i.e., a position which is located between a fully open position and a fully closed position. In the context of a lid being used in combination with a charging port, the intermediate position may be chosen in order to block a charging gun from being withdrawn from the charging port and/or in order to protect the charging port and its surroundings from adverse weather conditions during a charging procedure.

In this context, it should be possible to bring the lid into the intermediate position in a simple and precise manner. Once the lid has reached this intermediate position, it should stay there with high reliability.

It is an objective of the present disclosure to improve known lid assemblies in this respect. Thus, the intermediate position should be reachable in a simple and precise manner and the lid should be held in the intermediate position with high reliability.

The problem is at least partially solved or alleviated by the subject matter of the independent claims of the present disclosure, wherein further examples are incorporated in the dependent claims.

The present disclosure relates to a positioning mechanism for holding a lid element of a vehicle in an intermediate position between a fully open position and a fully closed position.

The present disclosure is additionally directed to a lid assembly for a vehicle. The lid assembly comprises such a positioning mechanism. The lid assembly is especially suitable for a charging port assembly of a vehicle.

According to a first aspect, there is provided a positioning mechanism for holding a lid element of a vehicle in an intermediate position between a fully open position and a fully closed position. The positioning mechanism comprises a base component, a first friction block carrying a first friction surface, a counter surface and an engagement element. The first friction block is supported on the base component via two pivotable first lever arms. The first lever arms are arranged in parallel and have the same length such that the first friction block, the two first lever arms and a portion of the base component form a first parallelogram. Additionally, the counter surface faces the first friction surface and is arranged in parallel to the first friction surface such that the first friction surface and the counter surface define a movement channel extending along a movement channel direction. The engagement element is receivable in the movement channel such that it contacts the first friction surface and the counter surface. Also, the first lever arms are inclined with respect to the movement channel direction. This means that the first lever arms extend neither perpendicular nor parallel to the movement channel direction. In a situation in which the engagement element is received in the movement channel, at least the contact between the first friction surface and the engagement element is subject to friction. Consequently, if the engagement element is subject to a movement being oriented into the same direction as a direction of inclination of the lever arms, due to the inclination of the lever arms, this movement tends to increase a distance between the first friction surface and the counter surface, i.e., a width of the movement channel. Consequently, the first friction surface and the counter surface restrict the movement of the engagement element to a small, especially negligible, extent only. In simplified words, the engagement element can freely move through the movement channel if it moves into the direction of inclination. In this context, the direction of inclination of the lever arms may be determined by splitting an extension of the lever arms into a first component of extension being oriented perpendicular to the first friction surface and a second component of extension being oriented in parallel to the first friction surface. The second component of extension defines the direction of inclination. Otherwise, if the engagement element moves against the direction of inclination, due to the inclination of the lever arms and the frictional contact between the engagement element and the first friction surface, this movement causes the first friction surface to approach the counter surface. In other words, the movement channel tends to be narrowed. This provides a noticeable resistance against the movement of the engagement element. In simplified words, the movement of the engagement element against the direction of inclination is blocked or inhibited. Consequently, a movement of the engagement element is allowed in one direction and blocked in an opposite direction. Furthermore, a movement of the engagement element against the direction of inclination may cause the first friction surface and the counter surface to clamp the engagement element there between. This means that the engagement element is immobilized. If the engagement element is connected to a lid element, the positioning mechanism allows the engagement element and the lid element to be brought into an intermediate position and securely held there. In other words, the engagement element and the lid element may be brought into the intermediate position in a simple manner. The absence of high resistance also has the effect that the intermediate position can be reached precisely. Once the intermediate position has been reached, a movement out of the intermediate position is blocked or inhibited. This may apply to both directions of movement. This means that a movement of the engagement element is either not possible or only possible if a comparatively high force is applied to the engagement element or the lid element. In other words, the engagement element and the lid element are held in the intermediate position in a reliable manner.

In an example, the engagement element and the first friction block are designed such that the engagement element is always movable by the force of a human hand, also in a direction against the direction of inclination. In other words, the immobilization of the engagement element may be overridden.

In an example, the engagement element is pin-shaped or block-shaped. Such an engagement element is structurally simple and may be reliably received in the movement channel and held between the friction surface and the counter surface.

In a further example, the first friction surface may be formed on a friction lining of the first friction block. In this context, the friction lining may be formed as a separate component and may be connected to the first friction block. Alternatively, the friction lining may be directly formed by a surface of the first friction block being the first friction surface. In the latter alternative, the surface of the friction block may have undergone a surface treatment which increases a friction coefficient between the surface and the engagement element. For example, the surface may have been roughened. Consequently, the engagement element may be securely held by the first friction block.

In an example, the counter surface is formed by a second friction surface of a second friction block. The second friction block is supported on the base component via two pivotable second lever arms. The second lever arms are arranged in parallel and have the same length such that the second friction block, the two second lever arms and a portion of the base component form a second parallelogram. Also, the second lever arms are inclined with respect to the movement channel direction. Consequently, the engagement element is receivable between the first friction surface and the second friction surface. The same effects and advantages that have already been explained in connection with the first friction block also apply to the second friction block. Reference is made to the above explanations.

In a further example, the second friction surface may be formed on a friction lining of the second friction block. In this context, the friction lining may be formed as a separate component and may be connected to the second friction block. Alternatively, the friction lining may be directly formed by a surface of the second friction block being the second friction surface. In the latter alternative, the surface of the second friction block may have undergone a surface treatment which increases a friction coefficient between the surface and the engagement element. For example, the surface may have been roughened. Consequently, the engagement element may be securely held by the second friction block.

In an example, an inclination direction of the first lever arms and an inclination direction of the second lever arms are the same. Additionally or alternatively, an inclination angle of the first lever arms and an inclination angle of the second lever arms are substantially equal in absolute values. At the same time, the first lever arms and the second lever arms are arranged on opposite sides of the movement channel. Consequently, both the first friction block and the second friction block block or inhibit a movement of the engagement element being located in a movement channel into the same direction. Consequently, the movement may be blocked or inhibited with particularly high reliability.

In an example, the engagement element may comprise an elastically deformable sleeve. The sleeve may be arranged such that the engagement element contacts the first friction surface and the counter surface which may be formed by the second friction surface, via the sleeve. The sleeve may enhance the friction between the first friction surface and the engagement element and/or between the counter surface and the engagement element. Consequently, the engagement element may be reliably clamped between the first friction surface and the counter surface or the second friction surface. Moreover, due to the elastic deformability of the sleeve, withdrawing the engagement element from the movement channel in a direction being opposed to the direction of inclination of the lever arms may be facilitated. In simplified words, when pulling out the engagement element from the movement channel against the direction of inclination, the sleeve may be deformed such that a force for pulling out the engagement element is reduced.

In an example, the elastically deformable sleeve may be made from a rubber material.

In an example, at least one of the first lever arms and the second lever arms is resiliently biased into a position in which the respective lever arm extends perpendicular to the movement channel direction. This means that at least one of the first lever arms and the second lever arms is biased into a position that corresponds to a narrowed movement channel. Consequently, the engagement element may be held in the movement channel in a reliable manner.

In an example, the positioning mechanism comprises a first abutment means defining a closest position of the first friction block with respect to a middle axis of the movement channel. Additionally or alternatively, the positioning mechanism comprises a second abutment means defining a closest position of the second friction block with respect to a middle axis of the movement channel. Consequently, a minimal width of the movement channel may be defined by the first abutment means and/or the second abutment means. Using such abutment means, a resistance which is provided by the first friction block and/or the second friction block against a movement of the engagement element against a direction of inclination may be limited. In this context, the resistance may be adjusted such that the engagement element and a lid element being possibly connected thereto is securely held in the intermediate position. At the same time, the resistance may be limited such that the engagement element may still be pulled out of the movement channel against the direction of inclination by hand.

According to a second aspect, there is provided a lid assembly for a vehicle. The lid assembly is especially suitable for a charging port assembly of a vehicle. The lid assembly comprises a support structure and a lid element. The lid element is movably supported on the support structure such that the lid element may assume a fully open position and a fully closed position. Moreover, the lid assembly comprises a positioning mechanism according to the present disclosure. The base component is connected to the support structure or formed by the support structure and the engagement element is coupled to the lid element. Consequently, the lid element may be easily brought into an intermediate position being located between the fully open position and the fully closed position. Additionally, the lid element may be securely held in this intermediate position via the engagement element.

In an example, the lid element is biased towards the fully open position or the fully closed position. For example, the lid element is spring biased. Consequently, in both alternatives, the lid element will always assume a well-defined position.

In an example, the engagement element is arranged on a carriage. The carriage is coupled to a linear guide which is located on the support structure such that the carriage is translatorily movable on the support structure. This configuration leads to the fact that the engagement element, the first friction surface and the counter surface which may be formed by a second friction service, are precisely located with respect to each other and are able to move in a precise manner with respect to each other.

In an example, the carriage is coupled to the lid element via a connection rod. Consequently, a movement of the lid element, which may be a fully pivotal movement or which may at least comprise a pivotal movement component, may be easily and reliably transformed into a purely translational movement of the carriage. Consequently, the movement of the engagement element on the carriage and the lid element is reliably coupled.

In an example, the engagement element is located in the movement channel if the lid element is in an intermediate position. The intermediate position is arranged between the fully open position and the fully closed position. Consequently, the lid element may be reliably held in the intermediate position. Optionally, the lid element may be reliably withdrawn from the intermediate position by applying a predefined force to the lid element which is sufficient for withdrawing the engagement element from the movement channel against the direction of inclination.

In an example, the engagement element is located in a first reception space being provided outside the movement channel on a first side of the movement channel if the lid element is in the fully closed position. In other words, in the fully closed position of the lid element, the engagement element is located outside the movement channel.

In an example, the engagement element is located in a second reception space being provided outside the movement channel on a second side of the movement channel if the lid element is in the fully open position. Thus, if the lid element is in the fully open position, the engagement element is also located outside the movement channel. At the same time, the engagement element is positioned on a side of the movement channel which may be opposed to the side on which the engagement element is located if the lid element is in the fully closed position. Consequently, the engagement element needs to traverse the movement channel, if the lid element is moved from the fully closed position into the fully open position or from the fully open position into the fully closed position.

In an example, the first lever arms and/or the second lever arms are inclined into an opening direction of the engagement element. The opening direction extends from the first side towards the second side. Consequently, the engagement element can move along the opening direction without any resistance or with a comparatively small resistance. The movement into an opposite direction may be blocked or inhibited by the positioning mechanism. Moreover, the engagement element may be immobilized following a movement in a direction opposite to the opening direction.

In another example, the first lever arms and/or the second lever arms are inclined into a closing direction of the engagement element. The closing direction extends from the second side towards the first side. Consequently, the engagement element can move along the closing direction without any resistance or with a comparatively small resistance. The movement into an opposite direction is blocked or inhibited by the positioning mechanism. Moreover, the engagement element may be immobilized following a movement in a direction opposite to the closing direction.

According to a third aspect, there is provided a charging port assembly for an electric vehicle. The charging port assembly comprises a lid assembly according to the present disclosure. The lid element is configured to selectively cover a charging port of the vehicle. Consequently, when the charging port is not in use, it may be protected by the lid element.

In the intermediate position, the lid element may be used as a weather protection, e.g., against snow or hail. Alternatively or additionally the lid element may be used in order to protect a charging gun from being pulled out. Due to the positioning mechanism, the engagement element and the lid element are securely held in the intermediate position.

It should be noted that the above examples may be combined with each other irrespective of the aspect involved.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

FIG. 1 shows a lid assembly according to the present disclosure comprising a positioning mechanism according to the present disclosure, wherein a lid element of the lid assembly is in a fully closed position, FIG. 2 shows a back side of the lid assembly of FIG. 1, FIG. 3 shows the lid assembly of FIGS. 1 and 2 in a view corresponding to the view of FIG. 1, wherein the lid element of the lid assembly is in a fully open position.

DETAILED DESCRIPTION

Figures 4, 5, 6:
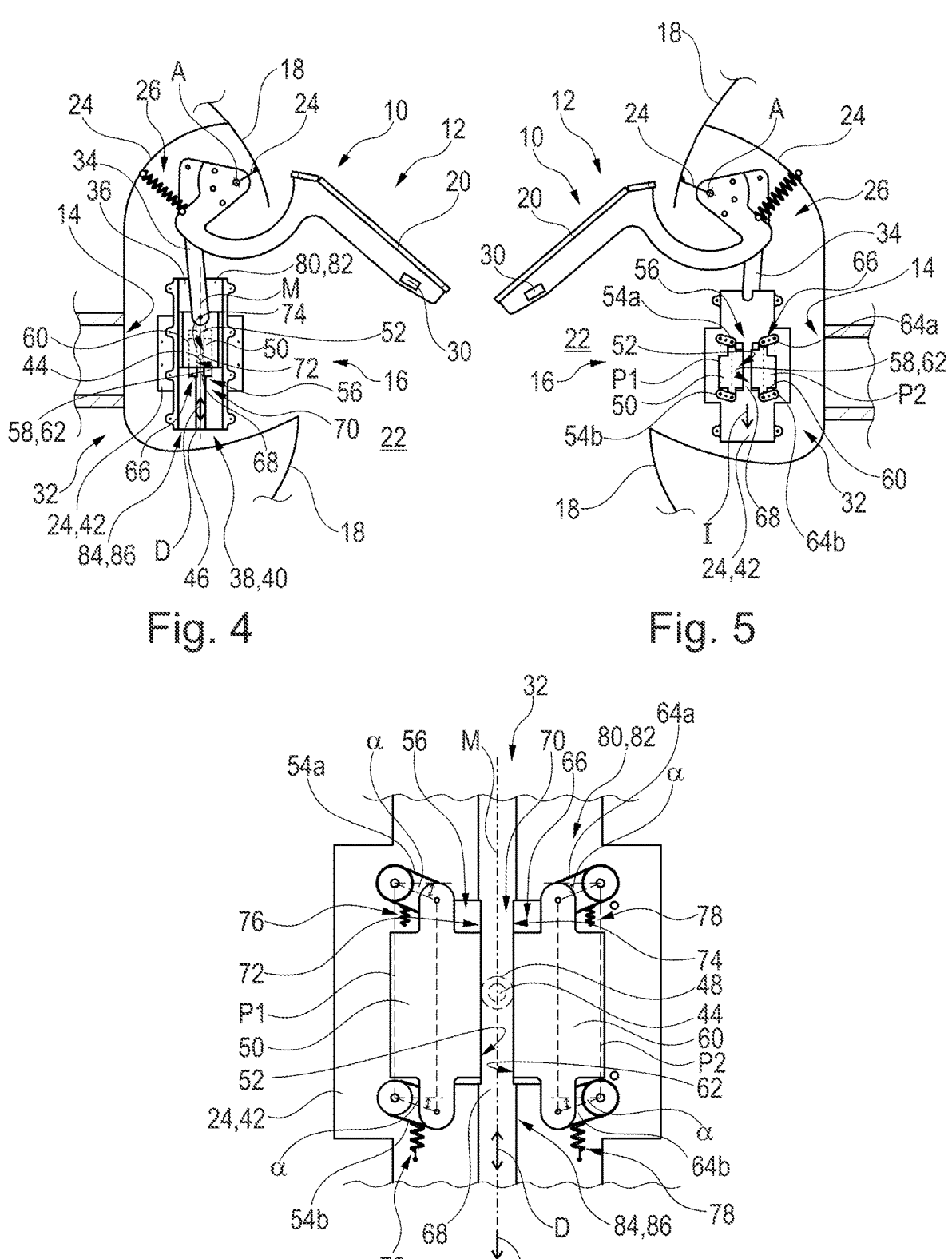
FIG. 4 shows the lid assembly of FIGS. 1 to 3 in a view corresponding to the view of FIG. 1, wherein the lid element of the lid assembly is in an intermediate position.
FIG. 5 shows a back side of the lid assembly of FIG. 4.
FIG. 6 shows an enlarged view of the positioning mechanism of the lid assembly of FIGS. 1 to 5.

The Figures are merely schematic representations and serve only to illustrate examples of the disclosure. Identical or equivalent elements are in principle provided with the same reference signs.

FIGS. 1 and 2 show a lid assembly 10 for a vehicle.

In the present example, the lid assembly 10 forms part of a charging port assembly 12 of the vehicle.

Besides the lid assembly 10, the charging port assembly 12 comprises a charging port 14 which is arranged in a cavity 16 of a body 18 of the vehicle.

It is noted that the charging port 14, the cavity 16 and the body 18 are only represented in a schematic manner.

If the lid assembly 10 or more precisely, a lid element 20 of the lid assembly 10, is in a fully closed position as shown in FIGS. 1 and 2, the charging port 14 is separated from an environment 22 by the lid assembly 10 or more precisely the lid element 20.

As will be explained in more detail further below, the lid assembly 10 may as well assume a fully open position. More precisely, the lid element 20 may be moved into a fully open position. In this case, the charging port 14 is accessible from the environment 22 (cf. FIG. 3).

The lid assembly 10 comprises a support structure 24.

The lid element 20 is pivotably supported on the support structure 24. The lid element 20 is, thus, able to pivot around an axis A with respect to the support structure 24.

By pivoting around the axis A, the lid element 20 may assume the fully closed position, as shown in FIGS. 1 and 2, the fully open position as shown in FIG. 3 and an intermediate position as shown in FIGS. 4 and 5. The intermediate position of the lid element 20 is arranged between the fully open position and the fully closed position.

In the present example, the lid element 20 is biased towards its fully open position by a spring element 26. The spring element 26 is connected to the lid element 20 and the support structure 24.

Moreover, the lid assembly 10 comprises a locking means 28 which is able to selectively protrude through an opening 30 at the lid element 20.

Consequently, using the locking means 28, the lid element 20 may be held in the fully closed position against the biasing force of the spring element 26.

If the locking means 28 is disengaged from the opening 30, the spring element 26 moves the lid element 20 into the fully open position.

The lid element 20 may also be held in the intermediate position (cf. FIGS. 4 and 5).

To this end, a positioning mechanism 32 is provided.

The lid element 20 is coupled to the positioning mechanism 32 by a connection rod 34 and a carriage 36.

The carriage 36 is linearly guided on the support structure 24 by a linear guide 38. In the present example, the linear guide 38 comprises a guiding channel 40 in which the carriage 36 is received.

The connection rod 34 is pivotably connected to the carriage 36 and to the lid element 20.

Using the connection rod 34, a pivotal movement of the lid element 20 around axis A is transformed into a translatory movement of the carriage 36 within the guiding channel 40.

As can be seen from FIGS. 1, 3 and 4, the carriage 36 is located at an upper end of the guiding channel 40 if the lid element 20 is in the fully closed position. If the lid element 20 is in the fully open position, the carriage 36 is arranged at a lower end of the guiding channel 40. If the lid element 20 is in an intermediate position, the carriage 36 is arranged between the lower end and the upper end of the guiding channel 40.

The positioning mechanism 32 comprises a base component 42 which in the present example is formed by the support structure 24. In other words, the support structure 24 and the base component 42 are formed by the same part.

Moreover, an engagement element 44 of the positioning mechanism 32 is arranged on the carriage 36.

In the present example, the engagement element 44 is pin-shaped. It is arranged in the lower half of the carriage 36 and extends into the drawing plane in FIGS. 1 and 4. More precisely, the engagement element 44 extends into a groove 46 which is provided in the guiding channel 40.

It is noted that in FIGS. 1 and 4, the carriage 36 is represented as a transparent part.

Consequently, the engagement element 44 is coupled to the lid element 20. This means that the engagement element 44 moves in a translatory manner if the lid element 20 is pivoted between the fully open position and the fully closed position.

The engagement element 44 comprises an elastically deformable sleeve 48 which is made from a rubber material.

Beyond that, the positioning mechanism 32 comprises a first friction block 50 carrying a first friction surface 52.

The first friction block 50 is supported on the base component 42 by two pivotable first lever arms 54a, 54b (see especially FIGS. 2, 5 and 6).

The first lever arms 54a, 54b are arranged in parallel and have the same length such that the first friction block 50, the two first lever arms 54a, 54b and a portion of the base component 42 form a first parallelogram P1.

The first friction surface 52 is arranged on the friction block 50 such that it faces the engagement element 44.

Consequently, by pivoting around the first lever arms 54a, 54b, the first friction surface 52 is movable, wherein it always stays in the same orientation.

As can be seen from FIGS. 1 and 2, a portion of the first friction block 50 which comprises the friction surface 52 protrudes through a first opening 56 in the base component 42 such that the first friction surface 52 limits a section of the groove 46.

The positioning mechanism 32 also comprises a counter surface 58 which is arranged in parallel to the first friction surface 52 and faces the first friction surface 52.

In the present example, the counter surface 58 is formed by a second friction block 60, more precisely by a second friction surface 62 of the second friction block 60.

Similar to the first friction block 50, the second friction block 60 is supported on the base component 42 by two pivotable second lever arms 64a, 64b (see especially FIGS. 2, 5 and 6).

The second lever arms 56a, 56b are arranged in parallel and have the same length such that the second friction block 60, the two second lever arms 56a, 56b and a portion of the base component 42 form a second parallelogram P2.

The second friction surface 62 is arranged on the second friction block 60 such that it faces the engagement element 44.

Consequently, by pivoting around the second lever arms 64a, 64b, the second friction surface 62 is movable, wherein it always stays in the same orientation.

As can be seen from FIGS. 1 and 2, a portion of the second friction block 60 which comprises the second friction surface 62 protrudes through a second opening 66 in the base component 42 such that the second friction surface 62 limits a section of the groove 46 on a side being opposed to the first friction surface 52.

The first friction surface 52 and the counter surface 58, i.e., the second friction surface 62, are arranged in parallel.

Moreover, the first friction surface 52 and the counter surface 58, i.e., the second friction surface 62, define a movement channel 70 there between.

The movement channel 70 extends along a movement channel direction D.

The movement channel direction D corresponds to a direction of the translatory movement of the carriage 36 within the guiding channel 40.

Thereby, a middle axis of the groove 46 coincides with a middle axis M of the movement channel 70.

In between the first opening 56 and the second opening 66, a portion of a base of the groove 46 is arranged. This portion has the form of a web 68.

The size of the first opening 56 and the size of the second opening 66, especially in a horizontal direction in the Figures, define a range of motion for the first friction block 50 and the second friction block 60 respectively.

In this context, the web 68 additionally acts as a first abutment means 72 defining a closest position of the first friction block 50 with respect to the middle axis M of the movement channel 70.

Additionally, the web 68 acts as a second abutment means 74 defining a closest position of the friction block 60 with respect to the middle axis M of the movement channel 70.

The ends of the first opening 56 and the second opening 66 which are arranged opposite to the web 68 respectively define a most remote position of the first friction block 50 and the second friction block 60 from the middle axis M of the movement channel 70 respectively.

In the present example, both first lever arms 54a, 54b and both lever arms 64a, 64b are inclined with respect to the movement channel direction D.

This means that a direction of extension of both first lever arms 54a, 54b and both second lever arms 64a, 64b is neither perpendicular nor parallel to the movement channel direction D.

In the present example, both first lever arms 54a, 54b and both second lever arms 64a, 64b are inclined into the same inclination direction I. In the Figures, the inclination direction I corresponds to a downward direction.

Moreover, an inclination angle $\alpha$ of all first lever arms 54a, 54b and all second lever arms 64a, 64b is substantially equal in absolute values. In the examples shown in the Figures, the inclination angle $\alpha$ is roughly 10°.

Furthermore, the first lever arms 54a, 54b and the second lever arms 64a, 64b are resiliently biased into a position in which the lever arms 54a, 54b, 64a, 64b extend perpendicular to the movement channel direction D. To this end, the first lever arms 54a, 54b are coupled with first biasing elements 76 and the second lever arms 64a, 64b are coupled with second biasing elements 78.

The first biasing elements 76 and the second biasing elements 78 are formed as springs.

Due to the corresponding spring forces, the first friction block 50 and the second friction block 60 are biased towards the web 68 respectively.

As has been mentioned before, the engagement element 44 may be received in the movement channel 70.

In this position, the engagement element 44, more precisely its sleeve 48, contacts the first friction surface 52 and the counter surface 58, i.e., the second friction surface 62.

Consequently, the engagement element 44, more precisely its sleeve 48, is in frictional engagement with each of the first friction surface 52 and the second friction surface 62.

Due to this configuration, the positioning mechanism 32 has different effects on the movement of the engagement element 44 depending on a direction of movement of the engagement element 44.

If the engagement element 44 is moved along the direction of inclination I, the frictional engagement acts on the first friction block 50 and the second friction block 60 in a way that the first friction block 50 and the second friction block 60 tend to pivot against the bias of the first biasing elements 76 and the bias of the second biasing elements 78 respectively. In other words, both the first friction block 50 and the second friction block 60 tend to move away from the web 68 and away from each other.

Thus, in this case, the frictional engagement of the engagement element 44 with the first friction block 50 and the second friction block 60 only provides a comparatively small resistance to the movement of the engagement element 44. The resistance may be so small that it is negligible.

However, if the engagement element 44 is moved in a direction opposite to the inclination direction I, the frictional engagement between the engagement element 44, more precisely the sleeve 48, and the first friction surface 52 and the second friction surface 62 tends to pivot the first friction block 50 and the second friction block 60 towards the web 68. This means that that the movement channel 70 is narrowed. This has the consequence that a resistance against the movement of the engagement element 44 is generated. Consequently, such a movement of the engagement element 44 is blocked or inhibited.

In other words, the engagement element 44 is clamped between the first friction surface 52 and the counter surface 58, i.e., the second friction surface.

It is noted that this effect is self-reinforcing since the movement channel 70 is even further narrowed if the engagement element 44 is moved further against the inclination direction.

Depending on the force which is used for moving the engagement element 44 against the inclination direction I, i.e., depending on the force which is used for clamping the engagement element 44 between the first friction surface 52 and the second friction surface 62, the engagement element 44 may be immobilized in this position.

This is especially the case if the forces acting on the engagement element 44 due to the frictional engagement of the engagement element 44 with the first friction surface 52 and the second friction surface 62 exceed a force resulting from the spring element 26 biasing the lid element 20 towards the fully open position.

Consequently, the lid element 20 is securely held in the intermediate position.

It is noted that in order to allow this functionality, a width of the web 68 needs to be smaller than a diameter of the engagement element 44.

Moreover, the clamping of the engagement element 44 between the first friction surface 52 and the second friction surface 62 is especially facilitated by the sleeve 48 being made from rubber material.

The lid assembly 10 may thus be used as follows.

It is assumed that initially, the lid element 20 is in the fully closed position and is locked using the locking means 28.

In this position of the lid element 20, the engagement element 44 is located in a first reception space 80 being provided outside the movement channel 70 on a first side 82 of the movement channel 70 (cf. FIG. 1).

If the locking means is withdrawn from the opening 30, the lid element 20 moves into the fully open position due to the bias of the spring element 26.

In this position of the lid element 20, the engagement element 44 is located in a second reception space 84 being provided outside the movement channel 70 on a second side 86 of the movement channel 70 (cf. FIG. 3).

When the lid element 20 moves from the fully closed position into the fully open position, the engagement element 44 moves from the first reception space 80 into the second reception space 84 thereby travelling through the movement channel 70.

This movement is designated as a movement in an opening direction, wherein the opening direction extends from the first side 82 towards the second side 86.

This movement is oriented in the inclination direction I. In other words, the first lever arms 54a, 54b and the second lever arms 56a, 56b are inclined into the opening direction. Consequently, the positioning mechanism 32 only provides a negligible resistance to this movement, when the engagement element travels through the movement channel 70.

When the lid element 20 is in the fully open position, a charge gun (not shown) may be plugged into the charging port 14.

Subsequently, a user may push the lid element 20 into an intermediate position which is for example a halfway closed position.

When doing so, the engagement 44 first travels within the second reception space 84 and then enters the movement channel 70.

This movement is designated as a movement in a closing direction, wherein the closing direction extends from the second side 86 towards the first side 82.

This movement is oriented against the inclination direction I. In other words, the first lever arms 54a, 54b and the second lever arms 56a, 56b are inclined in a direction opposite to the closing direction. Consequently, the engagement element will be clamped between the first friction surface 52 and the second friction surface 62.

This has two effects. First, the movement into the closing direction needs to be performed against a noticeable resistance when the engagement element 44 has entered the movement channel 70. This resistance results from the frictional engagement of the engagement element 44 and the first friction surface 52 and the second friction surface 62.

If the engagement element 44 is pushed far enough into the movement channel 70, the forces resulting from clamping the engagement element 44 between the first friction surface and the second friction surface will be bigger than a force acting on the engagement element 44 as a result of the biasing by the spring element 26.

Thus, the engagement element 44 is securely held in the movement channel 70.

If the lid element 20 shall be moved from the intermediate position into the fully open position, it needs to be subject to a force, e.g., by a human hand, which is big enough to overcome the forces resulting from the clamping of the engagement element 44 between the first friction surface 52 and the second friction surface 62.

In a case in which the lid element 20 shall be moved from the fully open position into the fully closed position, the engagement element 44 needs to travel through the movement channel along the closing direction. In order to reach the fully closed position, the lid element also needs to be subject to a force being big enough to push the engagement element 44 through the movement channel 70 along the closing direction. This force may be provided by a human hand.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS

10 lid assembly
12 charging port assembly
14 charging port
16 cavity
18 body of the vehicle
20 lid element
22 environment

24 support structure
26 spring element
28 locking means
30 opening
32 positioning mechanism
34 connection rod
36 carriage
38 linear guide
40 guiding channel
42 base component
44 engagement element
46 groove
48 elastically deformable sleeve
50 first friction block
52 first friction surface
54a first lever arm
54b first lever arm
56 first opening
58 counter surface
60 second friction block
62 second friction surface
64a second lever arm
64b second lever arm
66 second opening
68 web
70 movement channel
72 first abutment means
74 second abutment means
76 first biasing elements
78 second biasing element
80 first reception space
82 first side of the movement channel
84 second reception space
86 second side of the movement channel
α inclination angle
A pivot axis
D movement channel direction
I inclination direction
M middle axis
P1 first parallelogram
P2 second parallelogram

What is claimed is:

1. A positioning mechanism for holding a lid element of a vehicle in an intermediate position between a fully open position and a fully closed position, the positioning mechanism comprising:

a base component;

a first friction block carrying a first friction surface;

a counter surface; and an engagement element, wherein the first friction block is supported on the base component via two pivotable first lever arms, wherein the first lever arms are arranged in parallel and have the same length such that the first friction block, the two first lever arms, and a portion of the base component form a first parallelogram, wherein the counter surface faces the first friction surface and is arranged in parallel to the first friction surface such that the first friction surface and the counter surface define a movement channel extending along a movement channel direction, wherein the engagement element is receivable in the movement channel such that it contacts the first friction surface and the counter surface, and wherein the first lever arms are inclined with respect to the movement channel direction.

2. The positioning mechanism of claim 1,
wherein the counter surface is formed by a second friction surface of a second friction block,
wherein the second friction block is supported on the base component via two pivotable second lever arms,
wherein the second lever arms are arranged in parallel and have the same length such that the second friction block, the two second lever arms, and a portion of the base component form a second parallelogram, and
wherein the second lever arms are inclined with respect to the movement channel direction.

3. The positioning mechanism of claim 2,
wherein an inclination direction of the first lever arms and an inclination direction of the second lever arms are the same, or
wherein an inclination angle of the first lever arms and an inclination angle of the second lever arms are substantially equal in absolute values.

4. The positioning mechanism of claim 2, wherein at least one of the first lever arms and the second lever arms is resiliently biased into a position in which the respective lever arm extends perpendicular to the movement channel direction.

5. The positioning mechanism of claim 1, wherein the engagement element comprises an elastically deformable sleeve.

6. The positioning mechanism of claim 1, further comprising:
a first abutment means defining a closest position of the first friction block with respect to a middle axis of the movement channel, or
a second abutment means defining a closest position of the second friction block with respect to a middle axis of the movement channel.

7. A lid assembly for a vehicle, comprising:
a support structure;
a lid element, wherein the lid element is movably supported on the support structure such that the lid element may assume a fully open position and a fully closed position; and
a positioning mechanism for holding the lid element in an intermediate position between a fully open position and a fully closed position, the positioning mechanism comprising:
a base component;
a first friction block carrying a first friction surface;
a counter surface; and
an engagement element,
wherein the first friction block is supported on the base component via two pivotable first lever arms,
wherein the first lever arms are arranged in parallel and have the same length such that the first friction block, the two first lever arms, and a portion of the base component form a first parallelogram,
wherein the counter surface faces the first friction surface and is arranged in parallel to the first friction surface such that the first friction surface and the counter surface define a movement channel extending along a movement channel direction,
wherein the engagement element is receivable in the movement channel such that it contacts the first friction surface and the counter surface, and
wherein the first lever arms are inclined with respect to the movement channel direction,
wherein the base component is connected to the support structure or formed by the support structure, and wherein the engagement element is coupled to the lid element.

8. The lid assembly of claim 7, wherein the lid element is biased towards the fully open position or the fully closed position.

9. The lid assembly of claim 7, wherein the engagement element is arranged on a carriage coupled to a linear guide located on the support structure such that the carriage is translatorily movable on the support structure.

10. The lid assembly of claim 9, wherein the carriage is coupled to the lid element via a connection rod.

11. The lid assembly of claim 7, wherein the engagement element is located in the movement channel, if the lid element is in an intermediate position arranged between the fully open position and the fully closed position.

12. The lid assembly of claim 7, wherein the engagement element is located in a first reception space provided outside the movement channel on a first side of the movement channel if the lid element is in the fully closed position.

13. The lid assembly of claim 12, wherein the engagement element is located in a second reception space provided outside the movement channel on a second side of the movement channel if the lid element is in the fully open position.

14. The lid assembly of claim 13,
wherein the counter surface is formed by a second friction surface of a second friction block,
wherein the second friction block is supported on the base component via two pivotable second lever arms,
wherein the first lever arms or the second lever arms are inclined into an opening direction of the engagement element, and
wherein the opening direction extends from the first side towards the second side.

15. The lid assembly of claim 13,
wherein the counter surface is formed by a second friction surface of a second friction block,
wherein the second friction block is supported on the base component via two pivotable second lever arms,
wherein the first lever arms or the second lever arms are inclined into a closing direction of the engagement element, and
wherein the closing direction extends from the second side towards the first side.

16. An apparatus, comprising:
a base component;
a first friction block carrying a first friction surface;
a counter surface; and
an engagement element,
wherein the first friction block is supported on the base component via two pivotable first lever arms,
wherein the first lever arms are arranged in parallel and have the same length such that the first friction block, the two first lever arms, and a portion of the base component form a first parallelogram,
wherein the counter surface faces the first friction surface and is arranged in parallel to the first friction surface such that the first friction surface and the counter surface define a movement channel extending along a movement channel direction,
wherein the engagement element is receivable in the movement channel such that it contacts the first friction surface and the counter surface, and
wherein the first lever arms are inclined with respect to the movement channel direction.

17. The apparatus of claim 16,
wherein the counter surface is formed by a second friction
surface of a second friction block,
wherein the second friction block is supported on the base
component via two pivotable second lever arms,
wherein the second lever arms are arranged in parallel and
have the same length such that the second friction
block, the two second lever arms, and a portion of the
base component form a second parallelogram, and
wherein the second lever arms are inclined with respect to
the movement channel direction.

18. The apparatus of claim 17,
wherein an inclination direction of the first lever arms and
an inclination direction of the second lever arms are the
same, or
wherein an inclination angle of the first lever arms and an
inclination angle of the second lever arms are substan-
tially equal in absolute values.

19. The apparatus of claim 17, wherein at least one of the
first lever arms and the second lever arms is resiliently
biased into a position in which the respective lever arm
extends perpendicular to the movement channel direction.

20. The apparatus of claim 16, wherein the engagement
element comprises an elastically deformable sleeve.

\* \* \* \* \*